(12) United States Patent
Biskeborn (10) Patent No.: US 7,115,020 B1
(45) Date of Patent: Oct. 3, 2006

(54) LAPPING SYSTEM WITH MUTUALLY STABILIZED LAPPING CARRIERS

(75) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/100,849

(22) Filed: Apr. 7, 2005

(51) Int. Cl.
*B24B 41/06* (2006.01)
*B24B 7/00* (2006.01)

(52) U.S. Cl. .......................... 451/11; 451/391; 451/364
(58) Field of Classification Search ............... 451/391, 451/386, 364, 405, 5, 460, 11
See application file for complete search history.

(56) References Cited

U.S. PATENT DOCUMENTS

| | | | |
|---|---|---|---|
| 3,867,797 A * | 2/1975 | Meier | 451/286 |
| 4,536,992 A | 8/1985 | Hennenfent et al. | 51/109 R |
| 4,876,826 A * | 10/1989 | Denboer | 451/278 |
| 5,272,844 A * | 12/1993 | Burgess et al. | 451/405 |
| 5,468,177 A * | 11/1995 | Kindler et al. | 451/364 |
| 5,735,036 A | 4/1998 | Barr et al. | 29/603.12 |
| 5,967,878 A | 10/1999 | Arcona et al. | 451/5 |
| 6,074,291 A * | 6/2000 | Chang et al. | 451/391 |
| 6,080,043 A | 6/2000 | LeVan | 451/41 |
| 6,135,860 A * | 10/2000 | Tikhonov | 451/41 |
| 6,174,218 B1 | 1/2001 | Church et al. | 451/5 |
| 6,238,276 B1 | 5/2001 | Miyazaki et al. | 451/266 |
| 6,346,029 B1 | 2/2002 | Church et al. | 451/5 |
| 6,581,271 B1 | 6/2003 | Sasaki et al. | 29/603.09 |
| 2003/0199228 A1 | 10/2003 | Kennedy et al. | 451/11 |

* cited by examiner

*Primary Examiner*—Robert A. Rose
(74) *Attorney, Agent, or Firm*—Walter W. Duft (57) ABSTRACT

A lapping system for eliminating crowning in a surface to be lapped includes a first lapping carrier adapted to carry a first workpiece and a second lapping carrier adapted to carry a second workpiece. A stabilizer assembly interconnects the first and second lapping carriers in a mutually stabilizing arrangement that stabilizes the first and second workpieces against rotation. The stabilizer assembly includes first and second stabilizer arms extending between the first lapping carrier and the second lapping carrier. Each lapping carrier and an associated stabilizer arm collectively defines a fixture having a carrier portion and a stabilizer portion, and which may be generally T-shaped. One end of each stabilizer arm is cantilevered from its associated lapping carrier, while the free end of each stabilizer arm is pivotally mounted to the opposite lapping carrier. Downward lapping forces are applied independently to each lapping carrier. In an alternative embodiment, the stabilizer arm extending from the lapping carrier is mounted to an anchor that is not another lapping carrier.

21 Claims, 7 Drawing Sheets

LAPPING SYSTEM WITH MUTUALLY STABILIZED LAPPING CARRIERS

BACKGROUND OF THE INVENTION

1. Field of the Invention

This invention relates to the manufacture of magnetic heads used in magnetic storage devices such as disk drives and tape drives. More particularly, the invention is directed to an improved lapping apparatus that reduces or eliminates rocking motion during the lapping of magnetic head wafers comprising multi-slider row bars.

2. Description of the Prior Art

Figure 1:
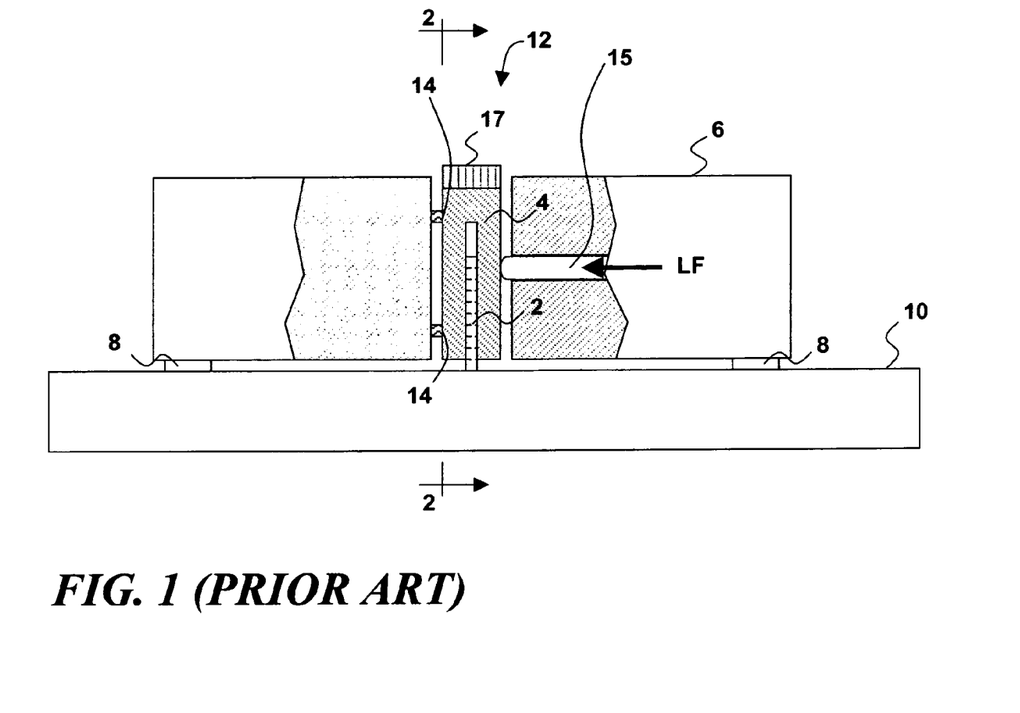
FIG. 1 is a side elevation view of a prior art lapping system in which a portion thereof is broken away to illustrate the fixturing of a workpiece for lapping.
Figure 2:
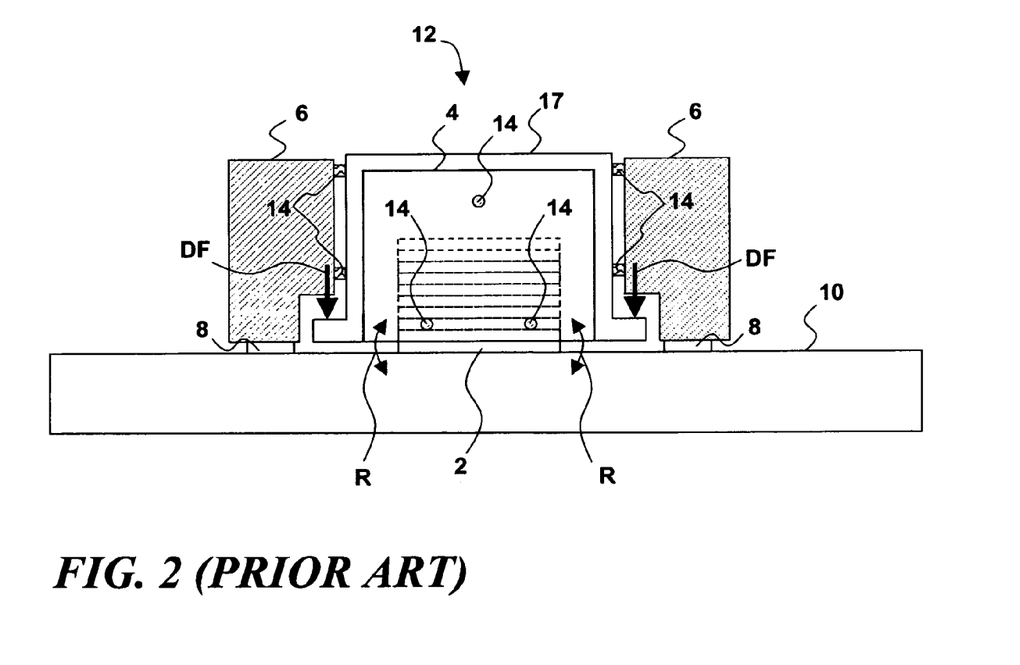
FIG. 2 is a cross-sectional view taken along line 2—2 in FIG. 1.

By way of background, the conventional fixturing of a magnetic head wafer workpiece for lapping can lead to an undesirable condition known as crowning. Crowning occurs when the row bar surface being lapped is allowed to rock during lapping, thus creating unwanted facets. FIGS. 1–4 (not to scale) are illustrative. These figures show a workpiece 2 secured in a lapping carrier 4 (sometimes referred to as a "magazine") that is in turn slidably mounted in a reference fixture 6 (sometimes referred to as a "nest"). The workpiece 2 is assumed to comprise a matrix of individual slider units arranged in a plurality of row bars. In FIG. 1, the row bars extend in a direction that is perpendicular to the plane of the figure. In FIG. 2, the row bars extend in a horizontal direction.

Figure 2A:
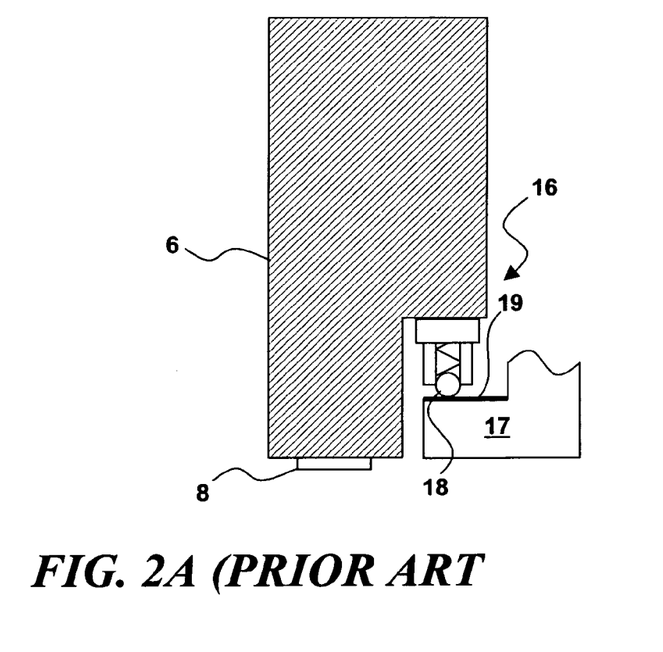
FIG. 2A is an enlarged detail view showing a portion of the structure of FIG. 2 that is used for loading a workpiece against a lapping surface.
Figure 3:
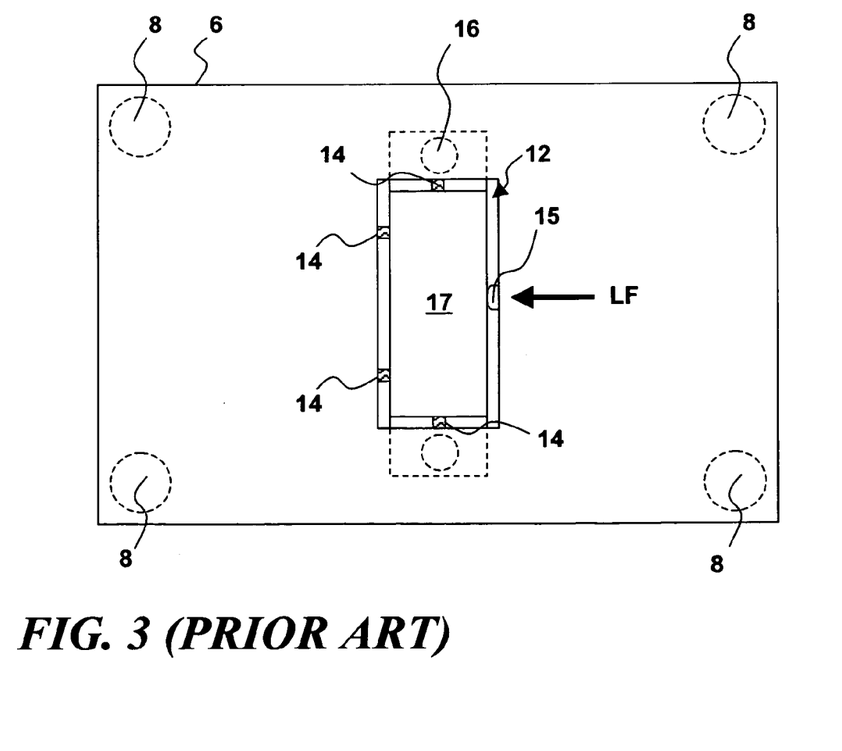
FIG. 3 is a plan view of the prior art lapping system of FIG. 1.

The reference fixture 6 has a set of support pads 8 on the bottom thereof that rest on the surface of a lapping element 10. This arrangement allows the reference fixture 6 and the lapping carrier 4 to move up and down, and thereby follow the lapping element's surface contour. The reference fixture 6 includes a vertically-walled aperture 12 that slideably receives the lapping carrier 4. In order to properly orient the workpiece 2 relative to the surface of the lapping element 10, a lateral force "LF" is applied to the lapping carrier 4 such that it is urged against positioning pads 14 extending from one of the walls of the aperture 12. The pads 14 serve as vertical reference surfaces for the lapping carrier 4. As shown in FIG. 1, there are three positioning pads 14 extending from the left vertical wall of the aperture 12. The lateral force LF is applied by way of a plunger actuator 15 or other force-imparting element (e.g., a spring). A downward force "DF" is also applied to the lapping carrier 4 to urge the lapping face of the lowermost row bar against the lapping element 10. As shown in FIGS. 2 and 2A, the downward force DF is applied using transducers 16 that engage a loading frame 17 placed over the lapping carrier 4. To ensure that no lateral forces are imparted to the lapping carrier 4, the transducers 16 have spring-loaded ball elements 18 that engage polished surfaces 19 on the loading frame 17. FIG. 2 also shows the use of additional positioning pads 14 on the ends of the lapping carrier 4.

Figure 4:
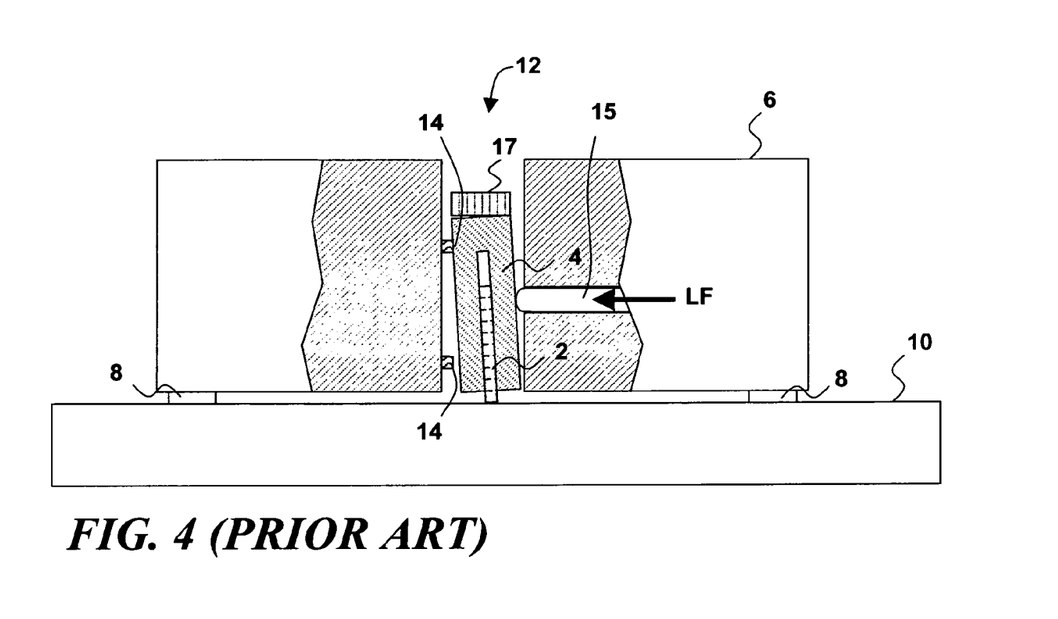
FIG. 4 is a side elevation view of the prior art lapping system of FIG. 1 showing how crowning can occur during lapping of the workpiece.

FIG. 1 is representative of ideal conditions wherein the plunger 15 at all times urges the lapping carrier 4 against the pads 14. In this position, the workpiece lapping face 18 maintains a constant angle relative to the lapping element 10. Unfortunately, as shown in FIG. 4, frictional forces imparted by the lapping element 10 to the workpiece 2 can overcome the lateral force LF and cause the lapping carrier 4 to pivot away from its home position against the pads 14. This produces the crowning effect referred to above.

In the fixture of FIGS. 1–4, crowning can be corrected by increasing the lateral force LF imparted to the lapping carrier 4 by the plunger 15. The problem with this standard technique for controlling crowning is that friction is increased between the lapping carrier 4 and the pads 14. This increased friction opposes the downward force DF applied to the lapping carrier 4 by the transducers 16, and can cause the lapping carrier to rotate about an axis that is perpendicular to the plane of FIG. 2, as shown by the arrows "R." This will result in non-uniform lapping across the row bar being lapped.

It is to improvements in the lapping of magnetic head wafer modules that the present invention is directed. In particular, what is needed is a lapping system design that effectively controls crowning without increasing the downward forces required to produce a required lapping force or introducing non-uniform lapping effects.

SUMMARY OF THE INVENTION

The foregoing problems are solved and an advance in the art is obtained by a novel lapping system which in a first exemplary embodiment includes a first lapping carrier adapted to carry a first workpiece and a second lapping carrier adapted to carry a second workpiece. A stabilizer assembly interconnects the first and second lapping carriers in a mutually stabilizing arrangement that stabilizes the first and second workpieces against rotation. The stabilizer assembly includes first and second stabilizer arms extending between the first lapping carrier and the second lapping carrier. Each lapping carrier and an associated stabilizer arm may be thought of as collectively defining a fixture having a carrier portion and a stabilizer portion. Each fixture may have a generally T-shaped configuration or other geometry. One end of each stabilizer arm is cantilevered from its associated lapping carrier. The free end of each stabilizer arm is pivotally mounted to the opposite lapping carrier, which functions as an anchor for the fixture whose stabilizing arm it supports. This pivotal mounting can be provided by way of protrusions on the free ends of the stabilizer arms engaging corresponding depressions formed in the lapping carriers. Retainers are used to maintain the protrusions in engagement with the depressions. The depressions are situated in recesses formed in the lapping carriers. Each depression is situated above and in line with the workpiece held by its associated carrier.

Lapping forces can be applied independently to each lapping carrier and the lapping force on one lapping carrier will not increase the lapping force on the other lapping carrier. The interconnecting stabilizer arms will substantially prevent rotation of the lapping carriers that would otherwise cause unwanted rocking of the workpieces.

In a further exemplary embodiment of the invention a lapping fixture is provided by a lapping carrier and a stabilizing arm. The free end of the stabilizer arm is mounted to an anchor that is not a lapping carrier. Instead, the anchor is provided by any suitable structure having a pad for resting on the lapping surface that laps the workpiece held by the lapping fixture. Insofar as the anchor is not a lapping carrier, the pad is not a workpiece.

In a further exemplary embodiment of the invention a reference fixture or "nest" is provided for maneuvering lapping fixtures according to the invention over the surface of a lapping element.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF THE PREFERRED EMBODIMENTS

The invention will now be described by way of exemplary embodiments shown by the drawing figures, in which like reference numerals indicate like elements in all of the several views.

Turning to FIGS. 5–9 (not to scale), a lapping system 20 includes a first lapping carrier 22 adapted to carry a first workpiece 24 and a second lapping carrier 26 adapted to carry a second workpiece 28. Each workpiece 24 and 28 represents a magnetic head wafer element comprising a matrix of individual slider units arranged in a plurality of row bars. The workpieces 24 and 28 may contain any desirable number of horizontal rows and vertical columns of slider units. For example, each workpiece 24 and 28 may comprise a wafer quarter-section (sometimes referred to as a "quad"), a wafer eighth-section (sometimes referred to as a "miniquad"), or even a single row bar. Each row bar includes a single row of adjacent slider units. The slider units may be of the type conventionally used in magnetic disk drives, magnetic tape drives, or any other storage device wherein a magnetic head may read or write information on a magnetic storage medium. Each row bar may further comprise one or more resistive sensors and/or lapping guides for controlling lapping. The dimensions of each row bar will depend on the feature size of the individual sliders. For example, in accordance with current manufacturing practices, each row bar could have a wafer thickness of approximately 2 mm, a row pitch of approximately 0.75 mm, and a row bar length determined by either the wafer size or the number of sliders in the workpiece. For a half wafer having the usual compliment of twenty-two sliders per row bar, a row bar length of approximately 47 mm would be typical.

The workpieces 24 and 28 are supported in receiving slots 30 and 32 of the associated lapping carriers 22 and 26. Any conventional mounting scheme may be used to secure the workpieces 24 and 28 in their respective slots 30 and 32. Each workpiece 24 and 28 is respectively held by its lapping carrier 22 and 26 such that the air bearing surfaces of the sliders in the row bar to be processed face a lapping element 34. The lapping element 34 can be conventionally provided by a lapping plate, a lapping tape, or other lapping medium that moves relative to the workpieces 24 and 28, as shown, for example, by the arrow 36 in FIG. 5.

Figure 6:
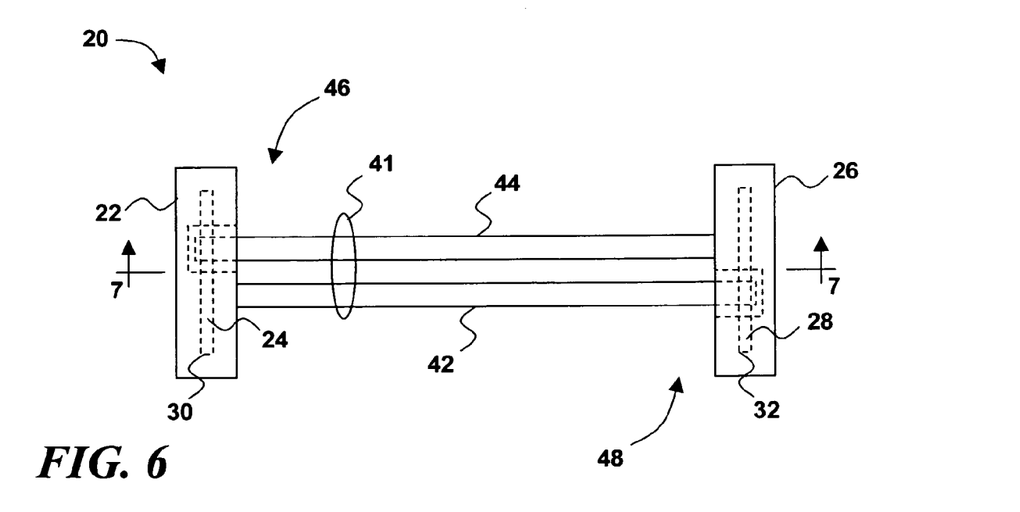
FIG. 6 is a top plan view of the lapping system of FIG. 5.

During lapping, the workpieces 24 and 28 are maintained in substantially vertical planes that are perpendicular to workpiece lapping faces 38 and 40. Alternatively, the workpieces 24 and 28 could be maintained at a fixed angle other than 90° relative to the workpiece lapping faces 38 and 40. A stabilizer assembly 41 interconnects the first and second lapping carriers 22 and 26 and allows the carriers to mutually stabilize each other against rotation. This mutual stabilization prevents rocking of the workpieces 24 and 28 that would otherwise produce unwanted facets on the lapping surfaces 38 and 40 (i.e., crowning). As best shown in FIG. 6, the stabilizer assembly 41 comprises a first stabilizer arm 42 cantilevered from the first lapping carrier 22, and a second stabilizer arm 44 cantilevered from the second lapping carrier 26. The stabilizer arms 42 and 44 are shown in the plan view orientation of FIG. 6 as being positioned laterally adjacent to each other. However, it should be understood that this arrangement is only exemplary in nature, and that a vertically stacked configuration could also be used in which one stabilizer arm is above the other.

Figure 5:
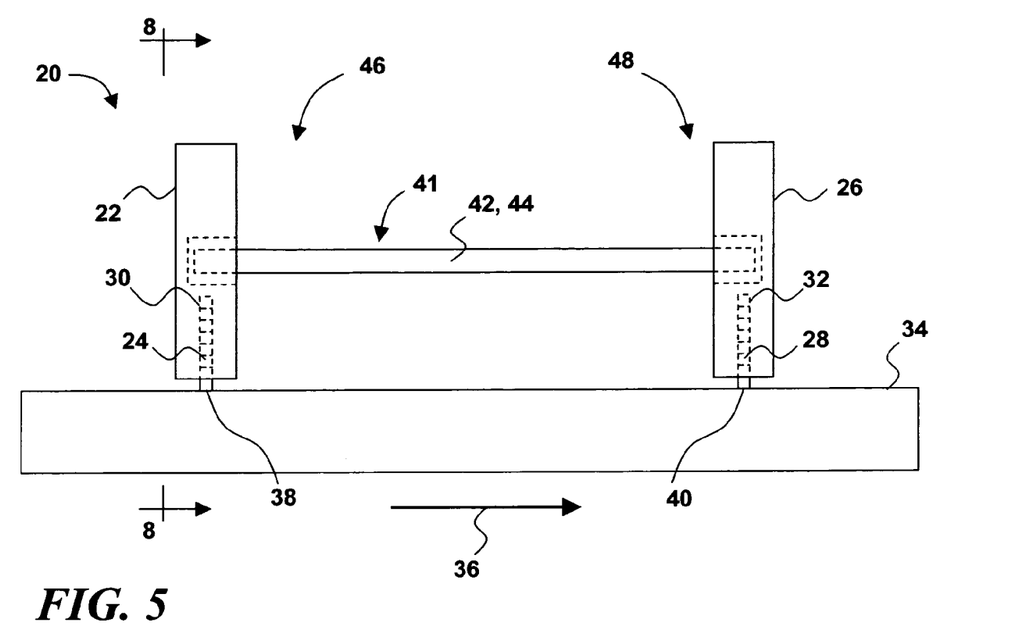
FIG. 5 is a side elevation view of a lapping system according to an exemplary embodiment of the invention.

With reference now to the side view orientation FIG. 5, the first stabilizer arm 42 and the first lapping carrier 22 may be thought of as collectively defining a first lapping fixture 46 that is generally T-shaped, with the first stabilizer arm 42 providing the long leg of the T and the first lapping carrier 22 forming the short leg of the T. Similarly, the second stabilizer arm 44 (not explicitly shown in FIG. 5) and the second lapping carrier 26 may be thought of as collectively defining a second T-shaped lapping fixture 48, with the second stabilizer arm 44 providing the long leg of the T and the second lapping carrier 26 forming the short leg of the T.

The stabilizer arms 42 and 44 extend orthogonally at an angle of approximately 90 degrees from the lapping carriers 22 and 26, respectively. Angles other than 90 degrees could also be used. The cantilevered end of each stabilizer arm 42 and 44 is fixedly mounted (as by integral formation) with its respective lapping carrier 22 and 26 to create the cantilever connection. The free end of each stabilizer arm 42 and 44 extends to the opposite lapping carrier 22 or 26, respectively. At this location, the free ends of the stabilizer arms 42 and 44 are pivotally mounted to create pivotal connections.

Figure 7:
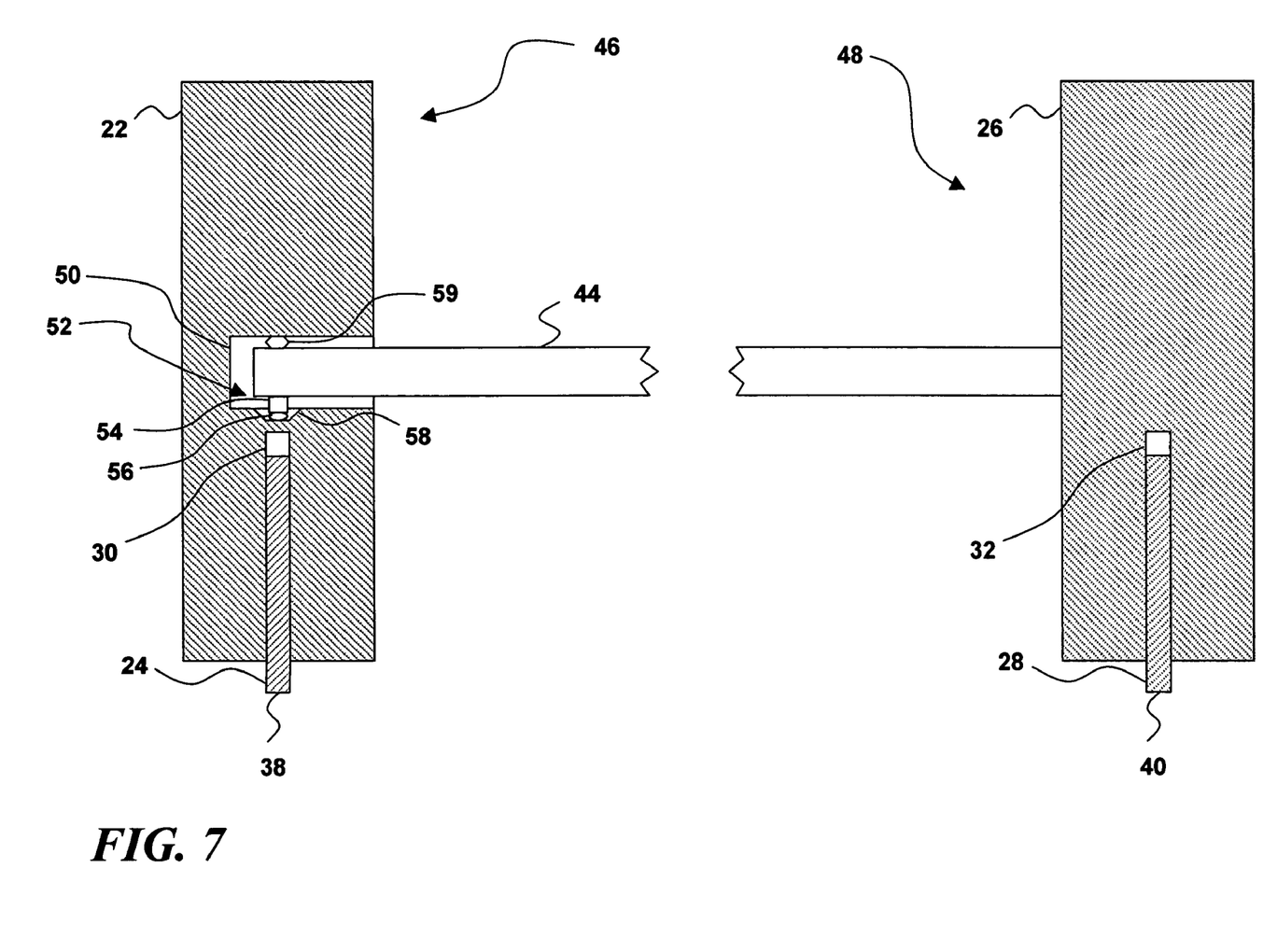
FIG. 7 is an enlarged cross-sectional view taken along line 7—7 in FIG. 6, with an intermediate section removed to reduce figure size.

Turning now to FIG. 7, a recess 50 formed in the lapping carrier 22 receives the free end of the stabilizer arm 44. A pivot structure 52 formed on the free end of the stabilizer arm 44 comprises a downwardly extending post 54 having a ball 56 (or other protrusion) at its lower end. The ball 56 of the pivot structure 52 is received in a corresponding socket 58 or other depression. The socket 58 is ideally located above, and in line with, the center of the workpiece 24 that is held by the lapping carrier 22. A spring-loaded retainer mechanism, such as a clip 59, can be used to bias the ball 50 and socket 58 together. Although not shown in the drawing figures, an identical pivotal connection is provided between the free end of the stabilizer arm 42 and the lapping carrier 26.

Figure 8:
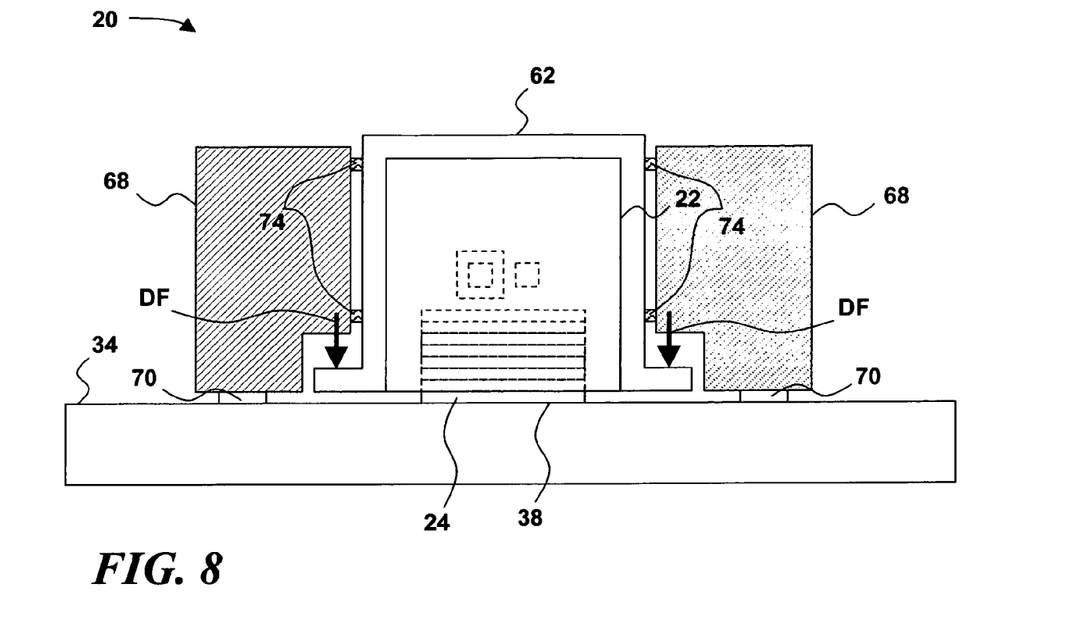
FIG. 8 is an end view taken in the direction of line 8—8 in FIG. 5.
Figure 8A:
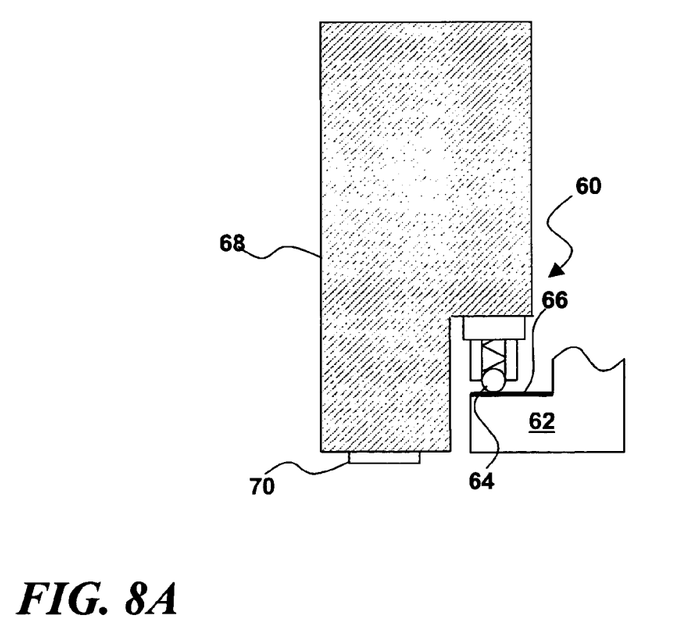
FIG. 8A is an enlarged detail view showing a portion of the structure of FIG. 8 that is used for loading a workpiece against a lapping surface.

As shown in FIGS. 8 and 8A, a downward force "DF" is applied to each lapping carrier 22 and 26 to actuate the carriers and urge the workpiece lapping faces 38 and 40 against the lapping element 34. The same arrangement described above in connection with FIGS. 2 and 2A may be used to impart the downward forces DF. In particular, the downward force DF can be applied using transducers 60 that engage a loading frame 62 placed over each lapping carrier 22 and 26. To ensure that no lateral forces are imparted to the lapping carriers 22 and 26, the transducers 60 have spring-loaded ball elements 64 that engage polished surfaces 66 on the loading frame 62. Preferably, the transducers 60 are designed to allow the lapping carriers 22 and 26 move vertically up and down and follow the contour of the lapping element 34.

Figure 9:
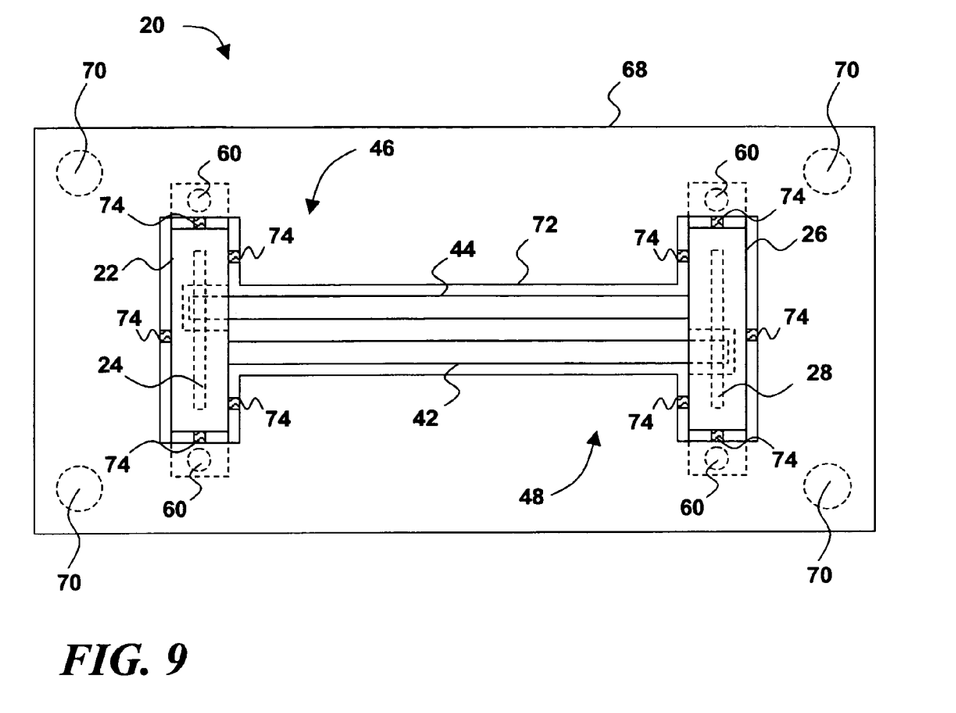
FIG. 9 is a plan view of the lapping system of FIG. 5.

As shown in FIG. 9, a reference fixture 68 or "nest" is provided to carry the transducers 60 and facilitate horizontal displacement of the lapping carriers 22 and 26 over the surface of the lapping element 34. The reference fixture 68 has four support pads 70 on the bottom thereof that rest on the surface of the lapping element 34. This arrangement allows the reference fixture 68 and the lapping carriers 22 and 26 to move up and down, and thereby follow the lapping element's surface contour. The reference fixture 68 is also formed with a generally "H" shaped, vertically-walled aperture 72 that slideably receives the lapping carriers 22 and 26. The aperture 72 is sized to provide clearance between the walls thereof and the lapping carriers 22/26 and stabilizer arms 42/44. A plurality of positioning pads 74 extending from the walls of the aperture 72 engage the carriers 22 and 26 to keep them spaced from the walls of the aperture 72. The positioning pads 74 can be provided by way of rigid members, or by resilient elements (such as springs), transducers and other loading devices that impart a lateral force on the carriers 22 and 26 that is sufficient to keep the carriers from contacting the walls of the aperture 72. The lateral loading applied by the positioning pads 74 allows the carriers 22 and 26 to be steered over the lapping element 34 during lapping without interfering with the transducers 60. The transducers 60 will be free to downwardly actuate the lapping carriers 22 and 26 without being subjected to vertical frictional forces induced by excessive lateral forces, as in the case of the conventional lapping system described by way of background above. It will be appreciated that separate reference fixtures or "nests" (not shown) could be used for each lapping carrier 22 and 26 instead of the single reference fixture 68. Again, there should be clearance between the reference fixtures and the lapping carriers 22 and 26 to accommodate pressure pads that impart lateral loading to the lapping carriers without generating vertical frictional forces that can interfere with the transducers 60.

The stabilizer arms 42 and 44 prevent excessive rocking of the workpieces 24 and 28 that is otherwise difficult to control, especially for lapping very small structures. Any rocking forces that are applied to a lapping carrier 22 or 26 will be opposed by the corresponding stabilizer arm 42 or 44 that is cantilevered therefrom. The cantilever connection causes each stabilizer arm 42 and 44 to act as a moment arm that transfers the rocking forces on the associated lapping carrier 22 or 26 into vertical forces applied via the stabilizer arm's pivot structure 52 to the opposite lapping carrier. Depending on the length of the stabilizer arms 42 and 44, the vertical forces applied to one lapping carrier 22 or 26 due to rocking of the opposite lapping carrier will be relatively small. These vertical forces will be counteracted by the downward forces DF applied to each lapping carrier 22 and 26, and by the lapping element 34 imparting upward forces to the lapping carriers. Any rocking of the workpieces 24 and 28 is thus substantially prevented. It is also noteworthy that the lapping faces 38 and 40 will be lapped at substantially the same rate, assuming the downward forces DF applied to each lapping carrier 22 and 26 are equal. This means that the stabilizer arms 42 and 44 will remain substantially horizontal, and will not rotate significantly as a result of one work piece 24 or 28 being lapped more quickly than the other workpiece. For example, if the stabilizer arms are 100 mm long and each lapping phase removes 0.1 mm from a given lapping face 38 or 40, the angular displacement experienced by the face being lapped will be only 1 part per 1000. The angle between the lapping faces 38 and 40 of the workpieces 24 and 28 can thus be tightly controlled. This can be important for downstream assembly tolerance control.

Note that the downward forces DF that are applied to one lapping carrier 22 or 26 will not substantially affect the other. This means that a lapping force actuating one workpiece 24 or 28 will not increase the lapping force actuating the other workpiece. The workpieces 24 and 28 will be lapped essentially independently of each other. Furthermore, the pivot structure 52 at the free end of each stabilizer arm 42 and 44 is supported ultimately by the workpiece 24 or 28 held by the lapping carrier 22 or 26 to which it is pivotally mounted. There are no features on the pivot structure 52 to wear out.

Figure 10:
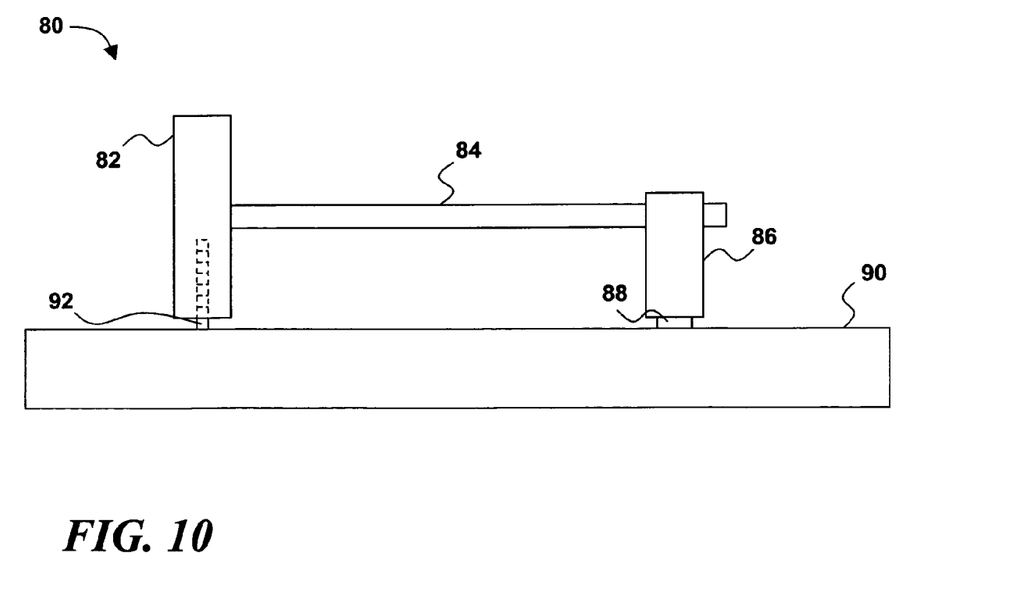
FIG. 10 is a side elevation view of a lapping fixture according to another exemplary embodiment of the invention.

It will be appreciated from the foregoing that each lapping carrier 22 and 26 functions as an anchor for anchoring the free end of a stabilizer arm 42 or 44 cantilevered from the opposite lapping carrier. Each workpiece 24 and 28 acts as a pad that supports the anchoring lapping carrier. FIG. 10 shows an alternative embodiment of the invention in which a lapping fixture 80 includes a lapping carrier 82 and a cantilevered stabilizer arm 84. The free end of the stabilizer arm 84 is rigidly mounted to an anchor 86 that is not a lapping carrier. The anchor 86 can be provided by any suitable structure having a support pad 88 for resting on a lapping element 90 that simultaneously laps a workpiece 92 held by the lapping carrier 82. The pad 88 in this embodiment will not be a workpiece insofar as the anchor 86 is not a lapping carrier. Depending on the weight of the anchor 86, downward forces may or may not have to be applied to the anchor to stabilize it.

Accordingly, a lapping system for lapping magnetic head wafer workpieces has been disclosed. Advantageously, workpiece rocking can be substantially eliminating without affecting the downward forces required to develop a required lapping force or introducing non-uniform lapping effects. While several embodiments of the invention have been shown and described, it should be apparent that many variations and alternative embodiments could be implemented. For example, although each lapping carrier 22/26 and its associated stabilizer arm 42/44 has a T-shaped configuration, many other configurations could also be used. For example, the stabilizer arms 42/44 could extend between the tops of the lapping carriers 22/26, thereby producing two L-shaped fixtures. Other configurations would result if the stabilizer arms 42/44 extended from the lapping carriers 22/26 at an angle other than 90 degrees. Still further configurations would be produced if the long portions were curved instead of straight, and so on. It is understood, therefore, that the invention is not to be in any way limited except in accordance with the spirit of the appended claims and their equivalents.

What is claimed is:

1. A lapping system for fixturing a magnetic head wafer workpiece for lapping, comprising:
   a first lapping carrier adapted to carry a first workpiece;
   a second lapping carrier adapted to carry a second workpiece; and a stabilizer assembly interconnecting said first and second lapping carriers in a mutually stabilizing arrangement that stabilizes said first and second workpieces against rotation without said stabilizer assembly being supported by other structure.

2. A lapping system in accordance with claim 1 wherein said first and second lapping carriers are adapted for actuation by independent downward lapping forces.

3. A lapping system in accordance with claim 1 wherein said stabilizer assembly comprises first and second stabilizer arms extending between said first lapping carrier and said second lapping carrier.

4. A lapping system in accordance with claim 3 wherein said first stabilizer arm is cantilevered from said first lapping carrier and said second stabilizer arm is cantilevered from said second lapping carrier.

5. A lapping system in accordance with claim 4 wherein a free end of said first stabilizer arm is pivotally mounted to said second lapping carrier and a free end of said second stabilizer arm is pivotally mounted to said first lapping carrier.

6. A lapping system in accordance with claim 5 wherein said pivotal mounting is provided by protrusions on said free ends of said first and second stabilizer arms engaging corresponding depressions formed in said first and second lapping carriers.

7. A lapping system in accordance with claim 6 wherein said pivotal mounting is further provided by retainers urging said protrusions into engagement with said depressions.

8. A lapping system in accordance with claim 7 wherein said retainers comprise biasing members.

9. A lapping system in accordance with claim 8 wherein said depressions are situated in recesses formed in said first and second lapping carriers.

10. A lapping system in accordance with claim 9 wherein each of said depressions is situated above and in line with one of said workpieces.

11. A lapping system for fixturing a magnetic head wafer workpiece for lapping, comprising:
    a lapping fixture having a carrier portion adapted to carry a workpiece and a stabilizer portion extending from said carrier portion;
    an anchor attached to a free end of said stabilizer portion for anchoring said lapping fixture;
    a pad on said anchor for supporting said anchor on a lapping surface that laps said workpiece; and
    said lapping fixture being configured so that said stabilizer portion does not restrict rotation of said workpiece about a longitudinal axis of said stabilizer portion.

12. A lapping system in accordance with claim 11 wherein said stabilizer portion extends from said carrier portion in an orthogonal orientation.

13. A lapping system in accordance with claim 11 wherein said fixture is generally T-shaped.

14. A lapping system in accordance with claim 11 wherein said stabilizer portion is cantilevered from said carrier portion.

15. A lapping system in accordance with claim 14 wherein a free end of said stabilizer portion is pivotally mounted to said anchor.

16. A lapping system in accordance with claim 15 wherein said pivotal mounting is provided by a protrusion on said free end of said stabilizer portion engaging a corresponding depression formed in said anchor.

17. A lapping system in accordance with claim 16 wherein said pivotal mounting is further provided by a retainer adapted to retain said protrusion in engagement with said depression.

18. A lapping system in accordance with claim 17 wherein said retainer comprises a clip member.

19. A lapping system in accordance with claim 18 wherein said depression is situated in a recess formed in said anchor.

20. A lapping system in accordance with claim 19 wherein said anchor is a second lapping fixture comprising a carrier portion adapted to carry a workpiece that provides said pad and a stabilizer portion extending from said carrier portion, and wherein said stabilizer portions of both lapping fixtures interconnect said carrier portions in a mutually stabilizing arrangement that stabilizes said workpieces against rotation.

21. A lapping system for fixturing a magnetic head wafer workpiece for lapping, comprising:
    a first lapping carrier adapted to carry a first workpiece;
    a second lapping carrier adapted to carry a second workpiece;
    a stabilizer assembly interconnecting said first and second lapping carriers in a mutually stabilizing arrangement that stabilizes said first and second workpieces against rotation;
    said first and second lapping carriers being adapted for actuation by independent downward lapping forces;
    said stabilizer assembly comprising first and second stabilizer arms extending between said first lapping carrier and said second lapping carrier;
    said first stabilizer arm being cantilevered from said first lapping carrier and said second stabilizer arm being cantilevered from said second lapping carrier;
    a free end of said first stabilizer arm being pivotally mounted to said second lapping carrier and a free end of said second stabilizer arm being pivotally mounted to said first lapping carrier;
    said pivotal mounting being provided by protrusions on said free ends of said first and second stabilizer arms engaging corresponding depressions formed in said first and second lapping carriers;
    said pivotal mounting being further provided by retainers urging said protrusions into engagement with said depressions;
    said retainers comprising biasing members;
    said depressions being situated in recesses formed in said first and second lapping carriers;
    said depressions being situated above and in line with one of said workpieces; and
    a reference fixture adapted to maneuver said lapping system horizontally over a lapping surface.

* * * * *